US008681416B2

(12) United States Patent
Suwald (10) Patent No.: US 8,681,416 B2
(45) Date of Patent: Mar. 25, 2014

(54) PASSIVE MULTIPLEXING EXTENSION FOR ELECTRONIC PAPER DISPLAYS

(75) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 185 days.

(21) Appl. No.: 13/290,008

(22) Filed: Nov. 4, 2011

(65) Prior Publication Data

US 2013/0114124 A1    May 9, 2013

(51) Int. Cl.
*G02B 26/00*    (2006.01)
*G09G 3/34*    (2006.01)

(52) U.S. Cl.
USPC ............. 359/296; 345/107; 345/49; 345/690; 349/122

(58) Field of Classification Search
USPC ............. 359/296, 245; 345/90, 92, 107, 204, 345/211, 468, 690; 712/13, 15; 455/456.1; 349/38, 39, 48, 49
See application file for complete search history.

(56) References Cited

U.S. PATENT DOCUMENTS

| 4,129,861 | A | | 12/1978 | Giglia | |
|---|---|---|---|---|---|
| 4,371,934 | A | * | 2/1983 | Wahl et al. ................. | 455/456.1 |
| 5,680,634 | A | * | 10/1997 | Estes ............................... | 712/15 |
| 7,522,067 | B2 | * | 4/2009 | Jensen et al. ................ | 340/691.1 |
| 2005/0030157 | A1 | | 2/2005 | Capurso et al. | |
| 2008/0273007 | A1 | | 11/2008 | Ng et al. | |
| 2010/0302287 | A1 | * | 12/2010 | Katayama et al. ............ | 345/690 |
| 2011/0013128 | A1 | | 1/2011 | Ginn | |

FOREIGN PATENT DOCUMENTS

EP    1 258 860 A1    11/2002

OTHER PUBLICATIONS

"Passiv-Matrix-Display", Wikipedia, 5 pgs. retrieved from the Internet at: Oct. 27, 2011 http://de.wikipedia.org/wiki/Passiv-Matrix-Display (Aug. 1, 2009) with English Machine Translation.
Extended European Search Report for Patent Appln. No. 12190866.9 (Mar. 12, 2013).
"Enabling Small-Format Electronic Paper in Smart Surfaces", Information Display, 3 pgs, retrieved from the internet at: http://www.sidmembers.org/idonline/article.cfm?year=2009&issue=07&file=art8, (Jul. 2009).

* cited by examiner

*Primary Examiner* — Loha Ben (57) ABSTRACT

A single-segment drive scheme for an electronic paper display (EPD) is replaced by a multiplexed drive scheme that reduces the number of driver pins to the number of display segments per digit or alphanumeric character plus one input/output (I/O) line per digit or alphanumeric character. In accordance with the invention, a passive digit selection mechanism enables a multiplex display drive scheme when the EPD material used typically has a stable threshold combined with a small hysteresis. Typically, display operation is better the smaller the hysteresis and the more stable the threshold of the EPD material that is used.

11 Claims, 7 Drawing Sheets

PASSIVE MULTIPLEXING EXTENSION FOR ELECTRONIC PAPER DISPLAYS

BACKGROUND

Typical implementations of alphanumeric electronic paper displays (EPD) are based on a single segment drive scheme, where every display segment is driven by one input/output (I/O) line. More complex displays require a large number of I/O lines, resulting in high-pin-count driver ICs. Typical high pin-count display driver devices are not typically suitable for low-cost implementations. Typically, costs are driven by expensive display drivers that require a large silicon area due to the large number of I/O lines; expensive flex-substrate due to the low-pitch of display drivers; a die-attach process requiring expensive pick and place equipment because high positioning accuracy is required due to the low-pitch display drivers; and reliability losses caused by the large number of I/O lines combined with the low-pitch, especially under mechanical stress. Alphanumeric electronic paper displays may be used, for example, in embedded smart cards, intelligent labels with display functionality, security tokens, bar code displays and electronic documents.

BRIEF SUMMARY OF INVENTION

The single-segment drive scheme for EPD is replaced by a multiplexed drive scheme that reduces the number of driver pins to the number of display segments per digit or alphanumeric character plus one input/output (I/O) line per digit or alphanumeric character. In accordance with the invention, a passive digit selection mechanism enables a multiplex display drive scheme when the EPD material used typically has a stable threshold combined with a small hysteresis. Typically, display operation is better the smaller the hysteresis and the more stable the threshold of the EPD material that is used.

DETAILED DESCRIPTION

Typically, the microcapsules of an electronic paper display (EPD) contain colored and pre-charged particles within a carrier fluid. These pigment particles move within the fluid under the influence of an electric field. The velocity of the particles within the carrier fluid is given by:

$$v = \mu \cdot E \quad (1)$$

where v is the velocity of the particles in the carrier fluid, $\mu$ is the electrophoretic mobility and E is the applied electric field. For example, black and white particles typically have opposite electrophoretic mobility. Assuming that the electric field is proportional to the applied voltage across the cell gap and the electrophoretic mobilities of the black and white particles are constant:

$$s_{part} = \int V dt \quad (2)$$

where $s_{part}$ is the particle displacement of particle 163 in microcapsule 164 and dt is the change in time. Combining Eq. (1) and Eq. (2) gives:

$$s_{part} = \mu \cdot \int E dt. \quad (3)$$

Figure 1A:
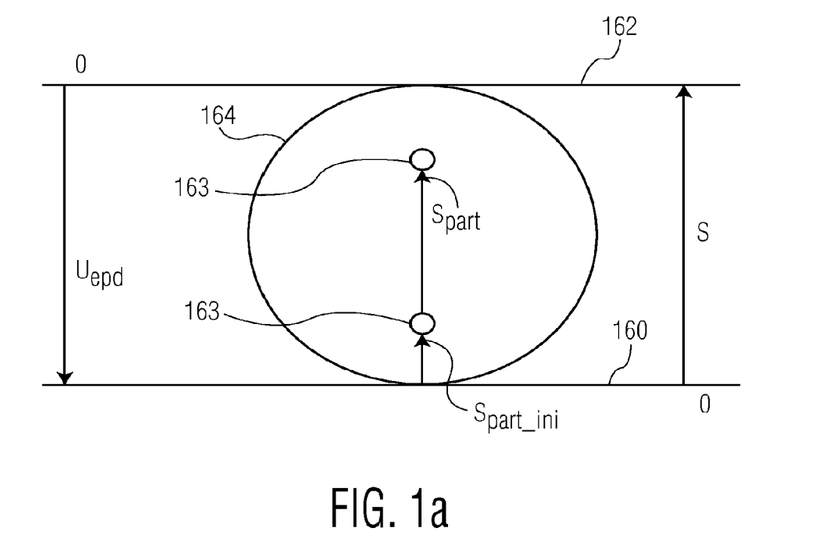
FIG. 1a shows an embodiment in accordance with the invention.

With reference to FIG. 1a:

$$E = u_{epd}/s \quad (4)$$

where $u_{epd}$ is the voltage difference between bottom electrode 160 and top electrode 162 which is typically ITO, and s (cell thickness) is the distance between bottom electrode 160 and top electrode 162. Defining:

$$k = \mu/s \quad (5)$$

where k is a constant dependent on the electrophoretic mobility $\mu$ and the cell thickness s allows the particle displacement to be written as:

$$s_{part} = k \cdot \int u_{epd}(t) dt. \quad (6)$$

The particle displacement $s_{part}$ is a function of the time integral of the applied voltage $u_{epd}(t)$. In the case of two particle colors, white and gray, a particle displacement $s_{part}$ greater than zero and less than s results in an intermediate gray level. Introducing an initial displacement $s_{part\_ini}$ for particle 163 as an integration constant yields:

$$s_{part\_tot} = s_{part\_ini} + k \cdot \int u_{epd}(t) dt \quad (7)$$

The total particle displacement $S_{part\_tot}$ is a function of the time integral of the applied voltage $u_{epd}(t)$ and the initial displacement $s_{part\_ini}$ which means that the gray level being represented by the initial displacement $s_{part\_ini}$ can be changed by further applying a voltage $u_{epd}(t)$ to particle 163.

In the typical operation of an EPD display, a voltage is applied to an EPD segment in order to change its color or produce a flip. Once the desired color change or flipping has been accomplished, the applied voltage is removed and the color state is maintained without further power consumption.

Figure 1B:
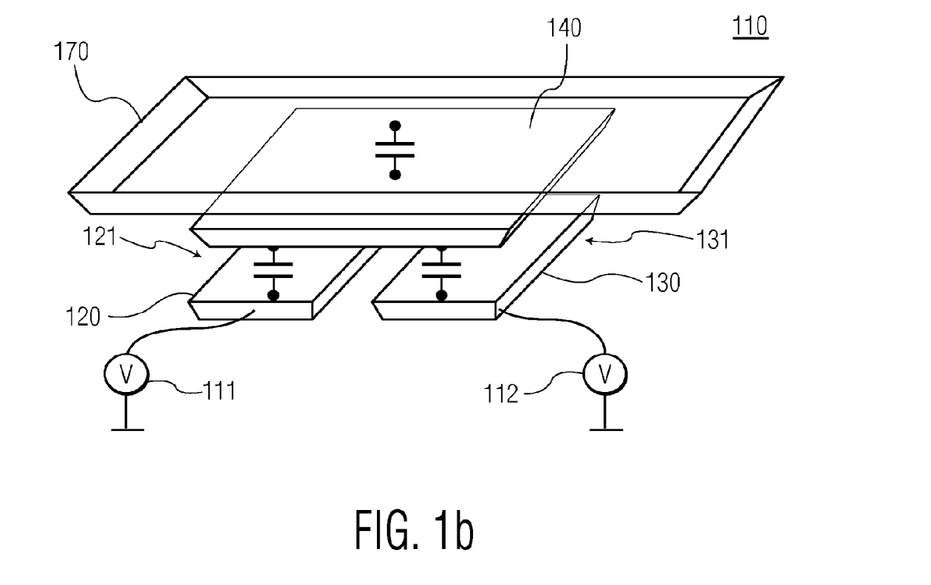
FIG. 1b shows an embodiment in accordance with the invention.

In accordance with an embodiment of the invention, capacitive voltage divider 110 is made up of two intrinsic capacitors 121 and 131. Capacitor 121 is formed by electrode 120 and floating collector 140. Capacitor 131 is formed by electrode 130 and floating collector 140 as shown in FIG. 1b. Capacitive divider 110 has two voltage inputs 111 and 112. Electronic paper display (EPD) film 170 is directly driven by the resulting voltage on floating collector 140. Capacitive voltage divider 110 achieves a selective reduction of the E field that controls the nonlinear EPD color change or flipping behavior. Note that capacitive voltage divider 110 can be typically implemented by silver printing or by copper in a standard board process.

Figure 2A:
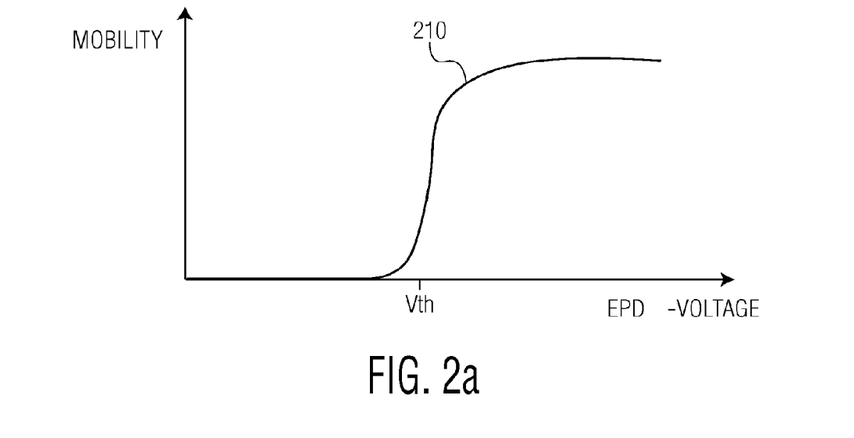
FIG. 2a shows the non-linear flipping behavior of electronic paper display film.

FIG. 2a shows the non-linear flipping behavior of EPD film 170. The nonlinear drive behavior shown by curve 210 arises primarily from the friction in the carrier fluid in EPD film 170. Once the voltage on floating collector 140 reaches $v_{th}$, curve 210 shows that flipping or color change occurs in EPD film 170. Typically, the applied voltage exceeds $v_{th}$ by a "safety" margin. Below $v_{th}$ (and at negative voltages related to $v_{th}$), EPD film 170 does not change state due to the low mobility.

Figure 2B:
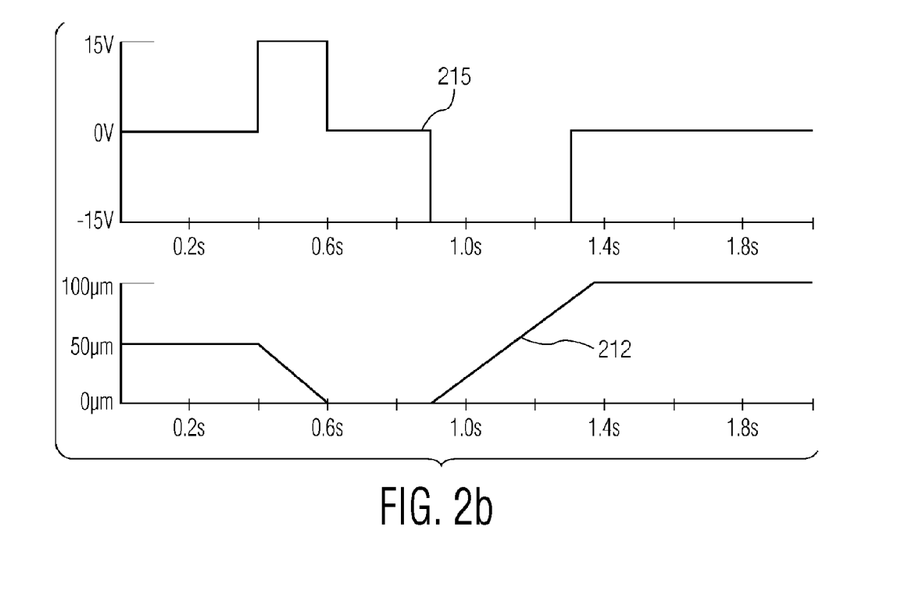
FIG. 2b shows applied voltage and displacement as a function of time for an embodiment in accordance with the invention.

The integrating reaction of an electrophoretic display on a driving voltage $u_{epd}$ applied for a specific period of time as expressed by Eq. (7) is shown in FIG. 2b in a simplified way. For the example shown in FIG. 2b, where curve 212 shows displacement $s_{part}$ as a function of time t, the initial displacement $s_{part\_ini}$ is 50 μm which represents an intermediate color level. Curve 215 shows the applied voltage as a function of time t. When at a time t=0.4 second, a positive voltage $u_{epd}$ of 15 volts is applied, the particle moves towards bottom electrode 160 (see FIG. 1a). After 0.2 second the particle's displacement $s_{part\_tot}$ is 0 μm (the particle has reached its bottom position). When at 0.9 second a negative voltage $u_{epd}$ of −15 volts is applied the particle moves towards top electrode 162 (see FIG. 1a). After 0.4 second the particle's displacement $s_{part\_tot}$ is 100 μm (the particle has reached its top position).

Because of the bi-stable nature of the electrophoretic material, a voltage of 0 volt on bottom electrode 160 will maintain the current state with no applied power. Intermediate gray levels can be obtained either by applying a voltage less than the drive voltage for a constant time or by applying the drive voltage for a time less than the 1 bit setup time (see Table 1).

Figure 2C:
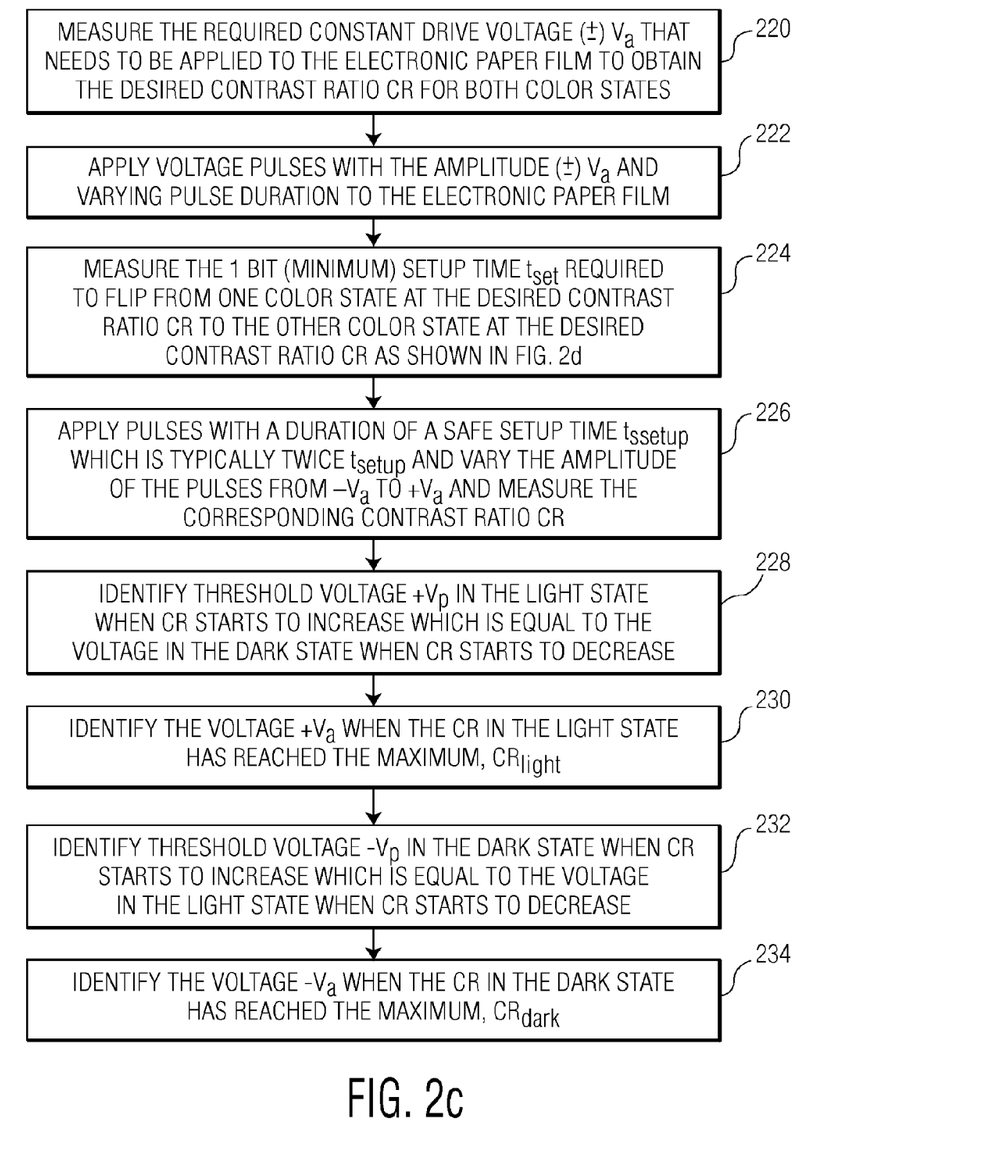
FIG. 2c shows the steps for calibration of the electronic paper display film in accordance with the invention.

In order to prepare electronic paper film in accordance with the invention, the electronic paper display film needs to be calibrated as shown in FIG. 2c. The calibration sequence is as follows:

In step 220, measure the required constant drive voltage (±) $V_a$ that needs to be applied to the electronic paper film to obtain the desired contrast ratio CR for both color states (e.g. dark and light).

In step 222, apply voltage pulses with the amplitude (±) $V_a$ and varying pulse duration to the electronic paper film.

Figure 2D:
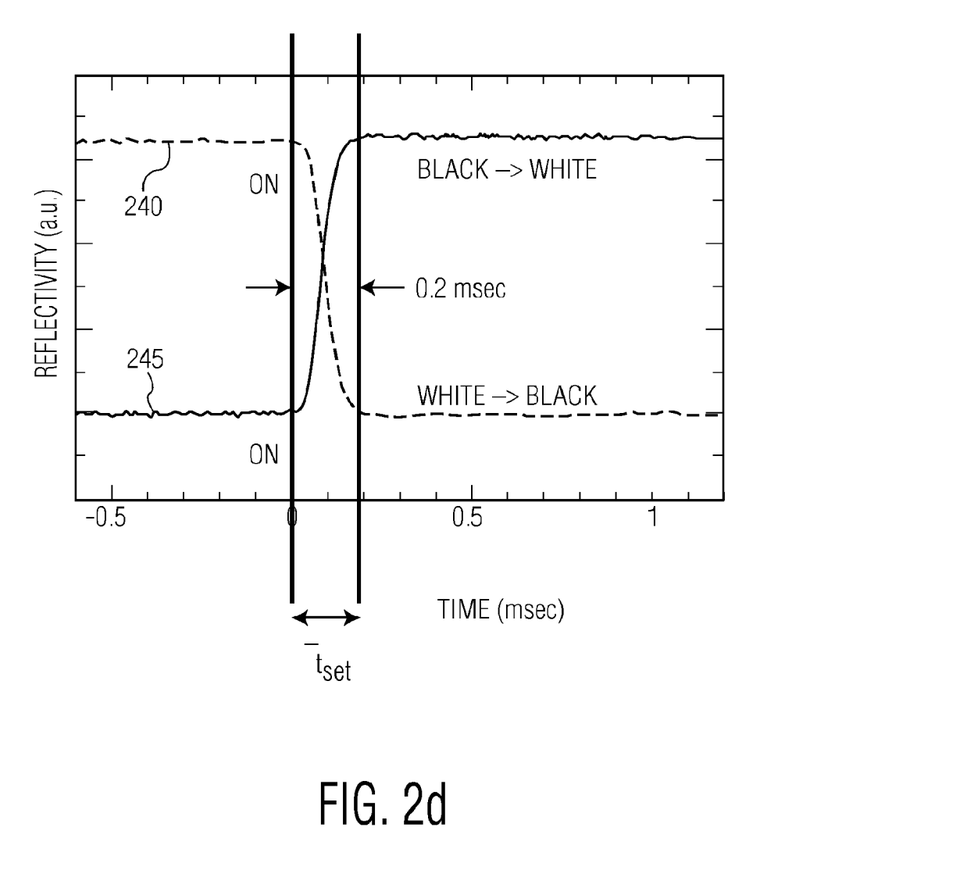
FIG. 2d shows the reflectivity transition from the light state (white) to the dark state (black) and the reflectivity transition from the dark state (black) to the light state (white) as a function of time for an exemplary electronic paper display film in accordance with the invention.

In step 224, measure the 1 bit (minimum) setup time $t_{set}$ required to flip from one color state at the desired contrast ratio CR to the other color state at the desired contrast ratio CR as shown in FIG. 2d for BRIDGESTONE QR-LPD. FIG. 2d shows curve 240 which gives the reflectivity transition from the light state (white) to the dark state (black) and curve 245 which gives the reflectivity transition from the dark state (black) to the light state (white) as a function of time for an exemplary electronic paper film in accordance with the invention. $t_{set}$ in FIG. 2d is 0.2 msec.

In step 226, apply pulses with a duration of a safe setup time $t_{ssetup}$ which is typically twice $t_{setup}$ and vary the amplitude of the pulses from $-V_a$ to $+V_a$ and measure the corresponding contrast ratio CR.

In step 228, identify threshold voltage $+V_p$ in the light state when CR starts to increase which is equal to the voltage in the dark state when CR starts to decrease.

In step 230, identify the voltage $+V_a$ when the CR in the light state has reached the maximum, $CR_{light}$.

In step 232, identify threshold voltage $-V_p$ in the dark state when CR starts to increase which is equal to the voltage in the light state when CR starts to decrease.

In step 234, identify the voltage $-V_a$ when the CR in the dark state has reached the maximum, $CR_{dark}$.

Figure 3:
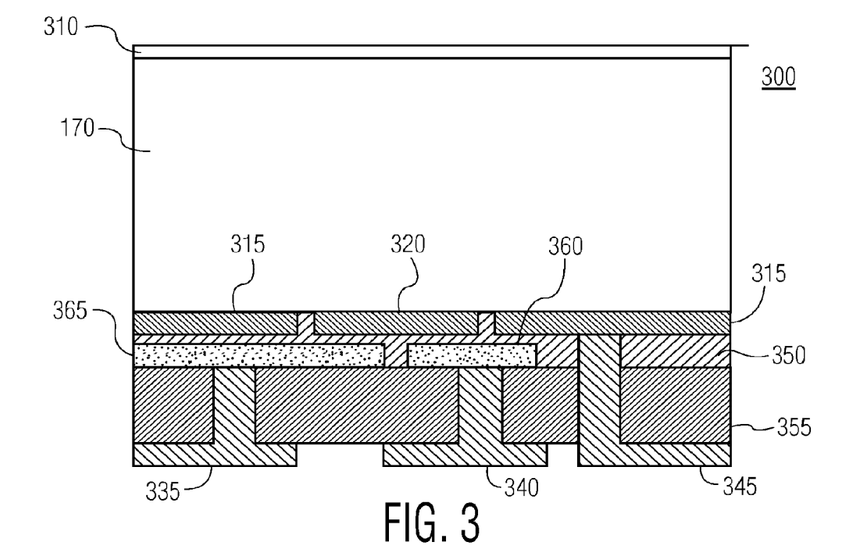
FIG. 3 shows a cross-section of an electronic paper display in accordance with an embodiment of the invention.

FIG. 3 shows a cross-section of electronic paper display with multiplexing 300 in accordance with an embodiment of the invention. EPD film 170 is covered by transparent indium tin oxide (ITO) or PEDOT common electrode 310. Common electrode 310 is not structured. Shield electrodes 315 are situated beneath EPD film 170 along with segment collector electrode 320. Note that segment collector electrode is completely isolated so that no junctions exist which could cause temperature dependent leakage currents. Polymer 350 provides the isolation between segment select electrode 365, digit select electrode 360 and segment collector electrode 320. Polymer 350 typically needs to have a relatively high dielectric constant in order to maintain a typical ratio of at least 15 between the capacitance of EPD film 170 and the selection capacitances (see FIG. 4). Polymer 350 may typically have a relative dielectric constant K that is as high as 20. Suitable polymer materials include poly(vinylidene fluoride-trifluoroethylene), barium titanate/benzocyclobutene, barium strontium titanate (e.g. $Ba_{0.6}Sr_{0.4}TiO_3$) and cyanoethylpullulan.

Segment select contact 335 is electrically coupled to segment select electrode 365, digit select contact 340 is electrically coupled to digit select electrode 360 and shield contact 345 is electrically coupled to shield electrode 315. Substrate 355 provides structural support for electronic paper display with multiplexing 300.

Figure 4:
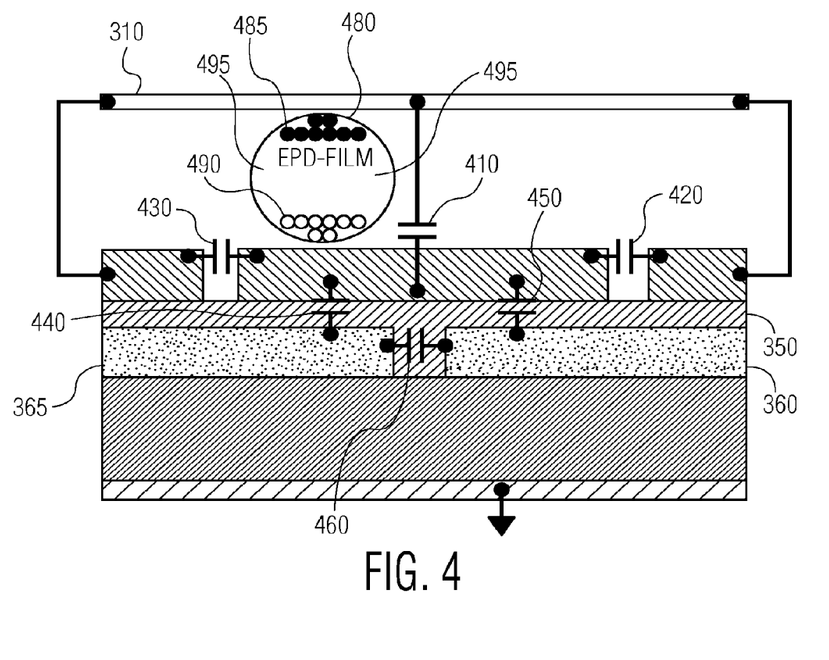
FIG. 4 shows the relevant capacitances and parasitic capacitances of an electronic paper display in accordance with an embodiment of the invention.

FIG. 4 shows the relevant capacitances and parasitic capacitances of electronic paper display with multiplexing 300 in accordance with an embodiment of the invention from FIG. 3 as well as an illustration of electronic ink microcapsule 480 that is comprised in EPD film 170. Capacitance 410 is the capacitance associated with EPD film 170. Capacitances 420 and 430 are the capacitances associated with shield electrodes 315. Capacitance 440 is the capacitance associated with segment select electrode 365 and capacitance 450 is the capacitance associated with digit select electrode 360. Note that capacitances 410, 440 and 450 form capacitive voltage divider 110 shown in FIG. 1b. Finally, capacitance 460 is the capacitance between segment select electrode 365 and digit select electrode 360.

In an embodiment in accordance with the invention, electronic ink microcapsule 480 is comprised of negatively charged black pigment particles 485 and positively charged white pigment particles 490 separated by clear fluid 495. Electronic ink microcapsule 480 is shown in its dark state. In the light state, the polarity is reversed and positively charged white pigment particles 490 occupy the positions of black pigment particles 485 while negatively charged black pigment particles 485 occupy the positions of positively charged white pigment particles 490 in FIG. 4.

Figure 5:
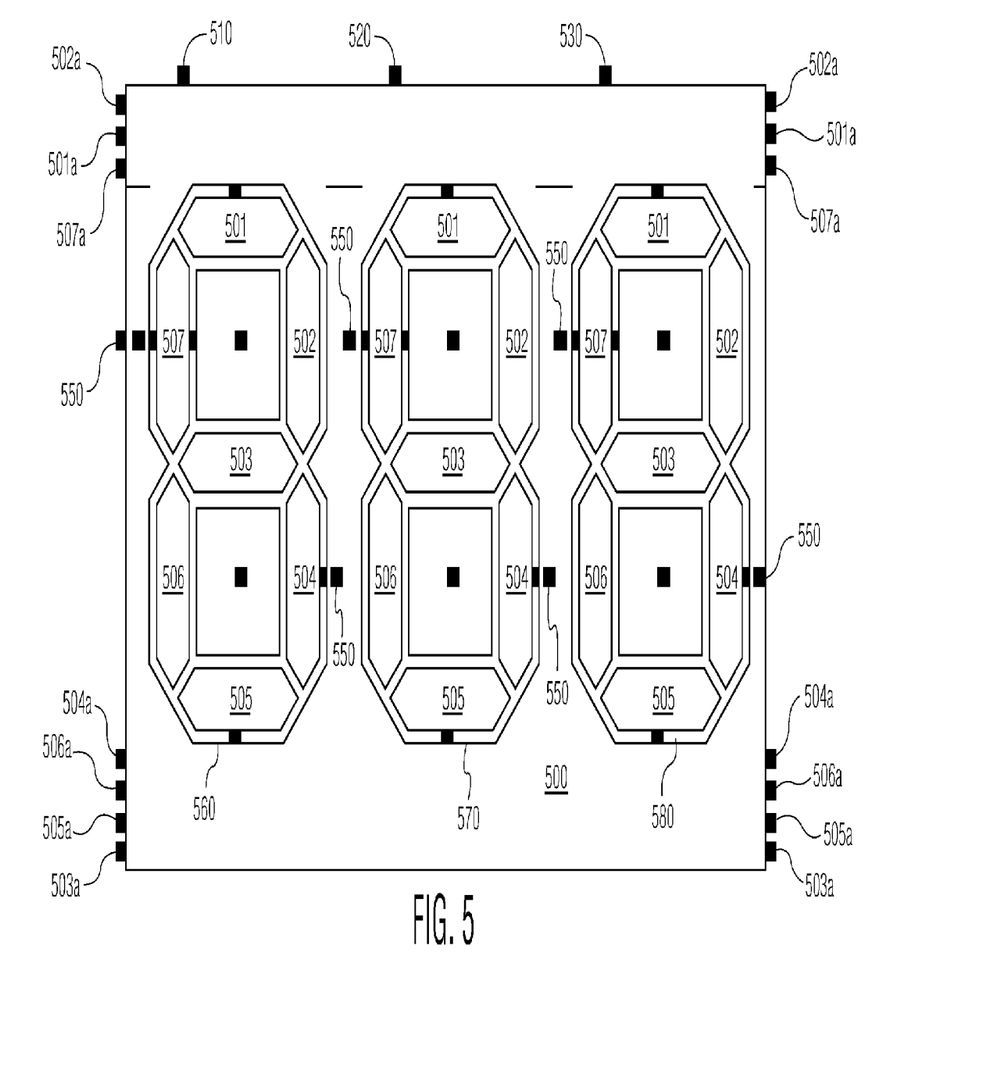
FIG. 5 shows a three digit-seven segment display in an embodiment in accordance with the invention.

Three digit-seven segment display 500 is shown in FIG. 5 to provide an exemplary embodiment in accordance with the invention. Segments 501, 502, 503, 504, 505, 506 and 507 each require input/output (I/O) lines 501a, 502a, 503a, 504a, 505a, 506a and 507a to create a digit, respectively. Three I/O lines 510, 520 and 530 are used to control access to digits 560, 570 and 580, respectively. I/O line 550 controls shield electrodes 315 (see FIG. 3) to set the background color (e.g., black or white). Top ITO common electrode 310 (not shown in FIG. 5) requires an additional I/O line (not shown).

As shown in FIG. 1b, capacitive voltage divider 110 has two voltage inputs 110 and 112 and controls the flipping of EPD film 170. If $V_{segment}$ is the voltage input on voltage input 110 and $V_{digit}$ is the voltage input on voltage input 112 then:

$$V_{out} = (C_{121} \cdot V_{segment} + C_{131} \cdot V_{digit})/(C_{121} + C_{131}) \tag{8}$$

where $C_{121}$ is the capacitance of the intrinsic capacitor 121 and $C_{131}$ is the capacitance of the intrinsic capacitor 131. Each segment 501, 502, 503, 504, 505, 506, 507 of each digit 560, 570 and 580 shown in FIG. 5 is controlled by a capacitive voltage divider similar to capacitive voltage divider 110. For example, with reference to changing segment 501 of digit 560 from black to white in FIG. 5, $V_{segment}$ is applied to I/O line 501a while $V_{digit}$ is applied to I/O line 510 and passes to voltage input 112 of all 7 capacitive voltage dividers of digit 560. Segments 501 of digits 560, 570 and 580 are connected in parallel so that $V_{segment}$ is applied to all segments 501 through I/O line 501a. If flipping to white requires a $V_{th}$=3 volts (with $C_{121}=C_{131}$), for example, and $V_{segment}$=4 volts and $V_{digit}$=7 volts, then segment 501 of digit 560 starts to turn to white with the application of $V_{out}$=5.5 volts using Eq. (8). The higher the voltage $V_{out}$ the faster the white state will be achieved. Assuming segment 501 of digit 570 is also black but is not to be flipped to white, $V_{segment}$=4 volts as all segments 501 are connected in parallel but $V_{digit}$=0 volt is applied to I/O line 520 and $V_{out}$=2 volts so that segment 501 of digit 570 does not start to turn to white. As can be seen, flipping is controlled by the voltage on I/O inputs 510, 520 and 530 which provide the voltage to digits 560, 570 and 580, respectively.

Figure 6:
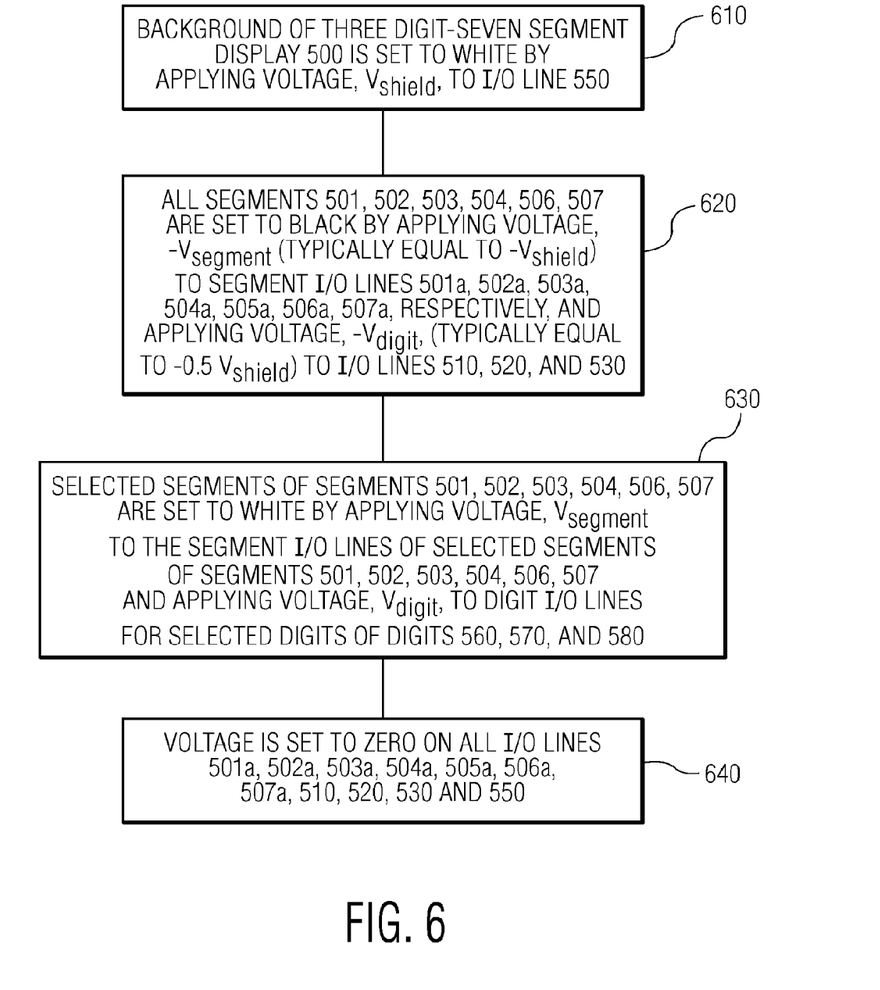
FIG. 6 shows a typical exemplary display drive sequence for the implementation of an active black on white display for an embodiment in accordance with the invention

FIG. 6 shows a typical exemplary display drive sequence for the implementation of an active black on white display in accordance with the invention. In step 610, the background of three digit-seven segment display 500 is set to white by applying voltage, $V_{shield}$, to I/O line 550. In step 620, all segments 501, 502, 503, 504, 506, 507 are set to black by applying voltage, $-V_{segment}$ (typically equal to $-V_{shield}$) to segment I/O lines 501a, 502a, 503a, 504a, 505a, 506a and 507a, respectively, and applying voltage, $-V_{digit}$ (typically equal to $-V_{shield}$) to I/O lines 510, 520 and 530. In step 630, selected segments of segments 501, 502, 503, 504, 506, 507 are set to white by applying voltage, $V_{segment}$, to the segment I/O lines of selected segments of segments 501, 502, 503, 504, 506, 507 and applying voltage, $V_{digit}$, to digit I/O lines for selected digits of digits 560, 570 and 580. Finally, in step 640, voltage is set to zero on all I/O lines 501a, 502a, 503a, 504a, 505a, 506a, 507a, 510, 520, 530 and 550. Due to the nonlinearity of the flipping behavior shown in FIG. 2a, the display will be stable with no power being supplied. Note that for a white on black display the voltages in FIG. 6 are inverted.

In accordance with the invention, other electrophoretic displays such as SIPIX MICROCUP and BRIDGESTONE QR-LPD may also be used. The use of SIPIX MICROCUP typically requires modification of the required voltage levels to adapt to the different threshold voltages shown in Table 1 and the electrophoretic mobilities represented by the 1 bit setup time of the display material shown in Table 1. BRIDGESTONE QR-LPD operates on an electrostatic principle that is similar to E-Ink. Because the charged particles are suspended in air, a higher voltage is typically needed to drive the display. Positive, negative and both intermediate voltage levels need to be adjusted for the threshold voltages shown in Table 1 and electrophoretic mobilities represented by the 1 bit setup time of the display material shown in Table 1.

Table 1 shows typical values for materials that are suitable for the electrophoretic display in accordance with the invention.

TABLE 1

| Material | Contrast Ratio | Threshold Voltage ($\pm V_p$) | Drive Voltage ($\pm V_a$) | 1 bit setup time ($t_{set}$) (ms) |
|---|---|---|---|---|
| E Ink Vizplex | 7 | 3-5 | 10-12 | 260 |
| E Ink Pearl | 10 | 5-7 | 15 | 120 |
| Bridgestone QRLPD | 8 | 35 | 90 | 0.3 |
| SIPIX MICROCUP PMEPD 1st gen | 10 | 10 | 24 | 60 |
| SIPIX MICROCUP PMEPD variant 1 | 12 | 12 | 75 | 120 |
| SIPIX MICROCUP PMEPD Variant 2 | 12 | 50 | 110 | 120 |

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A passive multiplexed electronic paper display comprising:
   an electronic paper display film divided into n alphanumeric character displays, each alphanumeric character display comprising m display segments; and
   m input/output lines, said m input/output lines being electrically coupled to n*m said display segments.

2. The passive multiplexed electronic paper display of claim 1 wherein each one of said n alphanumeric character displays is electrically coupled to a dedicated input/output line.

3. The passive multiplexed electronic paper display of claim 1 wherein a capacitive voltage divider provides an electric field to control a color change of each said segment of said alphanumeric character display.

4. The passive multiplexed electronic paper display of claim 3 wherein a threshold electric field is required to effect a color change of said segment.

5. The passive multiplexed electronic paper display of claim 1 wherein a shield electrode is situated below said electronic paper display film.

6. The passive multiplexed electronic paper display of claim 5 wherein a segment collector electrode is situated below said electronic paper display film.

7. The passive multiplexed electronic paper display of claim 6 wherein said segment collector electrode and said shield electrode are isolated from each other by a polymer.

8. The passive multiplexed electronic paper display of claim 1 wherein said electronic paper display film is comprised of electronic ink microcapsules.

9. The passive multiplexed electronic paper display of claim 8 wherein said electronic ink microcapsules contain colored and pre-charged particles within a carrier fluid.

10. The passive multiplexed electronic paper display of claim 1 further comprising a top electrode over said electronic paper display film.

11. The passive multiplexed electronic paper display of claim 10 wherein said top electrode is not structured.

* * * * *